G. Turner,
Hollow Auger.

Nº 12,926. Patented May 22, 1855.

UNITED STATES PATENT OFFICE.

GEORGE TURNER, OF EDINBOROUGH, PENNSYLVANIA.

MANDREL FOR CUTTING TAPERING STICKS.

Specification of Letters Patent No. 12,926, dated May 22, 1855.

*To all whom it may concern:*

Be it known that I, GEORGE TURNER, of Edinborough, Erie county, State of Pennsylvania, have invented a new and Improved Machine for Turning Whip-Stocks or any other Tapering Sticks; and I do hereby declare, that the following is a full and exact description thereof, reference being had to the accompanying drawings, and letters of reference marked thereon.

Figure 1:
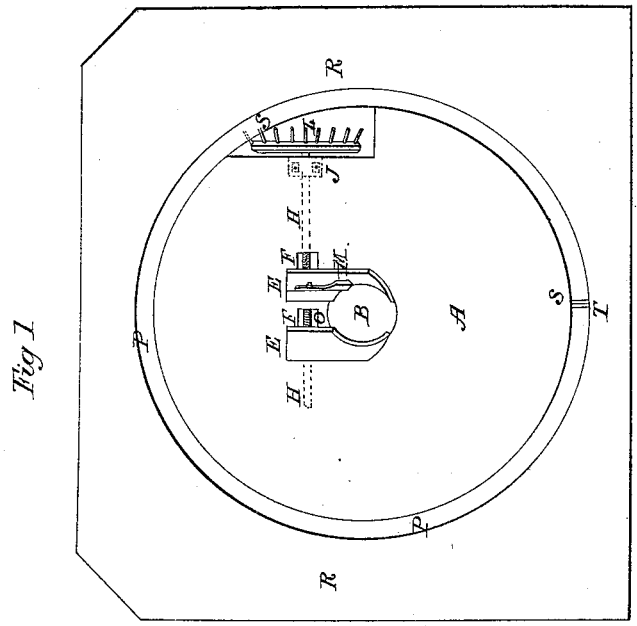

Figure 1 is a front view of my machine with all its parts adjusted in working order.

Figure 3:
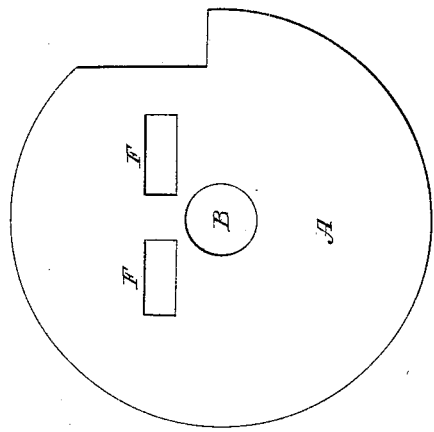
Figure 2:
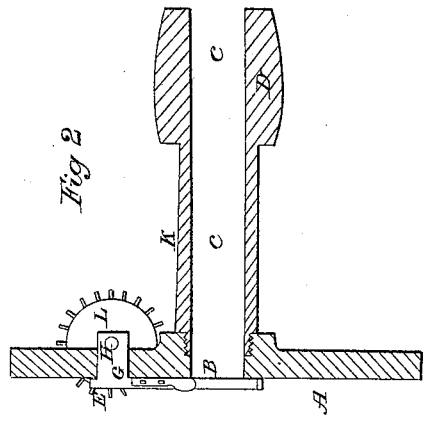

A is the face plate of my mandrel. In the center of this face plate is a hole B which is sufficiently large to permit the stick when turned to pass through. This hole passes through the mandrel K (on which the face plate is screwed) as shown at C C Fig. 2, which figure represents my mandrel and face plate divided laterally, showing the manner in which the nuts on the jaws pass through the face plate with the end of the screw shaft H.

D is a band pulley on the mandrel K.

E E, Fig. 1, are two jaws that have a projecting nut on their inner side. These nuts pass through the slots F F in the face plate A as shown at G, Fig. 2, and in one of these nuts a right hand screw is cut and in the other a left hand screw; in these nuts a corresponding right and left hand screw (on the shaft H H,) works. This shaft is attached to the face plate A by a box I bolted to it, and by means of the nuts on the jaws E E.

On the out end of the screw shaft H H is a cogged wheel L, and it is evident as this wheel is turned the two jaws E E are closed, or moved nearer the center of the hole B; on one of these jaws a cutter or chisel M is screwed which as the face plate revolves cuts the stick down to a size which will let it pass through between the jaws E E. The stick while turning rests against the jaw that has no cutter on which keeps it against the cutter M. The cogged wheel L is turned in the following manner, to wit, around the face plate A is a rim R R which is bolted fast to the bed of the lathe, and so adjusted that the face plate A will turn freely in it. On the inside of this rim is a single thread of a screw P P P P which passes once around the rim; starting from S and ending at T, between S and T one of the cogs on the wheel L passes at every revolution of the face plate and consequently turns the wheel L one cog at every revolution, which will turn the shaft H H, and by means of the right and left screw on said shaft, and in the nuts aforesaid will as the face plate and mandrel revolve, gradually bring the jaws E E together; and as the cutter M is screwed on one of the jaws, it will cut the stick a gradual and regular taper, as the stick passes through the mandrel.

What I claim as my invention and desire to secure by Letters Patent; is—

The construction of my face plate with the two jaws E E with the cutter M on one of them, and made to close together by means of the right and left screw shaft H H moved by means of the cogged wheel L, and the screw thread P P P P on the rim R R as herein described, or by any other construction substantially the same, and which will produce the intended effect.

GEORGE TURNER.

Witnesses:
A. B. RICHMOND,
SAMUEL COLE, JR.